(12) United States Patent
Hasegawa et al.

(10) Patent No.: US 11,193,322 B2
(45) Date of Patent: Dec. 7, 2021

(54) MANUFACTURING METHOD OF GLASS PANEL UNIT AND MANUFACTURING METHOD OF GLASS WINDOW

(71) Applicant: PANASONIC INTELLECTUAL PROPERTY MANAGEMENT CO., LTD., Osaka (JP)

(72) Inventors: Kazuya Hasegawa, Osaka (JP); Masataka Nonaka, Osaka (JP); Hiroyuki Abe, Osaka (JP); Tasuku Ishibashi, Osaka (JP); Eiichi Uriu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 16/338,422

(22) PCT Filed: Sep. 25, 2017

(86) PCT No.: PCT/JP2017/034452
§ 371 (c)(1),
(2) Date: Mar. 29, 2019

(87) PCT Pub. No.: WO2018/062071
PCT Pub. Date: Apr. 5, 2018

(65) Prior Publication Data
US 2020/0040644 A1 Feb. 6, 2020

(30) Foreign Application Priority Data

Sep. 30, 2016 (JP) .............................. JP2016-194688

(51) Int. Cl.
*E06B 3/66* (2006.01)
*C03C 27/06* (2006.01)
(Continued)

(52) U.S. Cl.
CPC ............ *E06B 3/6612* (2013.01); *C03C 27/06* (2013.01); *E06B 3/667* (2013.01); *E06B 3/673* (2013.01); *E06B 3/677* (2013.01); *E06B 3/67308* (2013.01)

(58) Field of Classification Search
CPC ........ E06B 3/673; E06B 3/6775; E06B 3/677; E06B 3/67308
See application file for complete search history.

(56) References Cited

U.S. PATENT DOCUMENTS 3,553,913 A * 1/1971 Eisenberg ............. E06B 3/6621
52/172
3,932,971 A * 1/1976 Day ........................ E06B 3/64
52/171.3
(Continued)

FOREIGN PATENT DOCUMENTS

CN 102557410 A 7/2012
JP H06-169850 A 6/1994
(Continued)

OTHER PUBLICATIONS

International Search Report and Written Opinion issued in International Patent Application No. PCT/JP2017/034452, dated Nov. 7, 2017; with partial English translation.

*Primary Examiner* — Donald J Loney
(74) *Attorney, Agent, or Firm* — McDermott Will and Emery LLP (57) ABSTRACT

A manufacturing method of a glass panel unit of the present invention includes a bonding step, a pressure reduction step, and a sealing step. In the bonding step, a first substrate and a second substrate are hermetically bonded together with a seal having a frame shape. In the pressure reduction step, a pressure in an inside space formed between the first substrate and the second substrate is reduced through an exhaust port. In the sealing step, sealant melted is dropped toward (Continued)

the exhaust port, thereby sealing the exhaust port with the sealant.

7 Claims, 11 Drawing Sheets

(51) Int. Cl.
    *E06B 3/667*     (2006.01)
    *E06B 3/673*     (2006.01)
    *E06B 3/677*     (2006.01)

(56)     References Cited

U.S. PATENT DOCUMENTS

| | | | |
|---|---|---|---|
| 2002/0121111 A1* | 9/2002 | Yoshizawa | E06B 3/6775 65/34 |
| 2014/0335291 A1 | 11/2014 | Hasegawa et al. | |
| 2014/0356558 A1 | 12/2014 | Hasegawa et al. | |
| 2017/0226791 A1 | 8/2017 | Hasegawa et al. | |
| 2018/0038152 A1 | 2/2018 | Nonaka et al. | |

FOREIGN PATENT DOCUMENTS

| | | |
|---|---|---|
| JP | H08-024147 A | 1/1996 |
| JP | 2016-064982 A | 4/2016 |
| JP | 2016-069232 A | 5/2016 |
| WO | 2016/143328 A1 | 9/2016 |

\* cited by examiner

MANUFACTURING METHOD OF GLASS PANEL UNIT AND MANUFACTURING METHOD OF GLASS WINDOW

CROSS-REFERENCE OF RELATED APPLICATIONS

This application is the U.S. National Phase under 35 U.S.C. § 371 of International Patent Application No. PCT/JP2017/034452, filed on Sep. 25, 2017, which in turn claims the benefit of Japanese Application No. 2016-194688, filed on Sep. 30, 2016, the entire disclosures of which Applications are incorporated by reference herein.

TECHNICAL FIELD

The present invention relates to a manufacturing method of a glass panel unit having thermal insulation properties, and a manufacturing method of a glass window having thermal insulation properties.

BACKGROUND ART

Patent Literature 1 describes a method for fabricating a glass panel unit having thermal insulation properties by bonding a first substrate and a second substrate with a seal. According to this method, a pressure in an inside space formed between the first substrate and the second substrate is reduced through an exhaust port formed in the first substrate or the second substrate, and then, a partition provided in the inside space having the pressure thus reduced is deformed by heating. The partition thus deformed airtightly partitions the inside space into one subspace in which the exhaust port is open and the other subspace. Then, a cutting-off step is performed to remove a part corresponding to the subspace in which the exhaust port is open, thereby obtaining a glass panel unit.

In the above-described known manufacturing method of a glass panel unit, the cutting-off step has to be performed to obtain the glass panel unit. This leads to a reduced usage efficiency of materials. Moreover, when at least one of the first substrate and the second substrate is made of strengthened glass, cutting-off is not easy.

CITATION LIST

Patent Literature

Patent Literature 1: JP 2016-69232 A

SUMMARY OF INVENTION

It is an object of the present invention to efficiently manufacture a glass panel unit and a glass window having thermal insulation properties without the cutting-off step.

A manufacturing method of a glass panel unit of one aspect of the present invention includes a bonding step, a pressure reduction step, and a sealing step. The bonding step is a step of hermetically bonding a first surface on one side in a thickness direction of a first substrate and a second surface on one side in a thickness direction of a second substrate together with a seal having a frame shaped. The first substrate includes at least a glass pane. The second substrate includes at least a glass pane. The pressure reduction step is a step of reducing a pressure in an inside space surrounded by the first surface, the second surface, and the seal through an exhaust port formed in the first substrate or the second substrate. The sealing step is a step of sealing the exhaust port with a reduced pressure in the inside space being maintained.

In the sealing step, sealant melted is ejected toward the exhaust port to seal the exhaust port with the sealant.

A manufacturing method of a glass window one of another aspect of the present invention includes a fitting step of fitting a window frame to the glass panel unit manufactured by the manufacturing method of the glass panel unit of the one aspect of the present invention.

DESCRIPTION OF EMBODIMENTS

[Glass Panel Unit]
(First Embodiment)

With reference to FIGS. 1 to 6, a glass panel unit 9 of a first embodiment and a manufacturing method thereof will be described.

Figure 5:
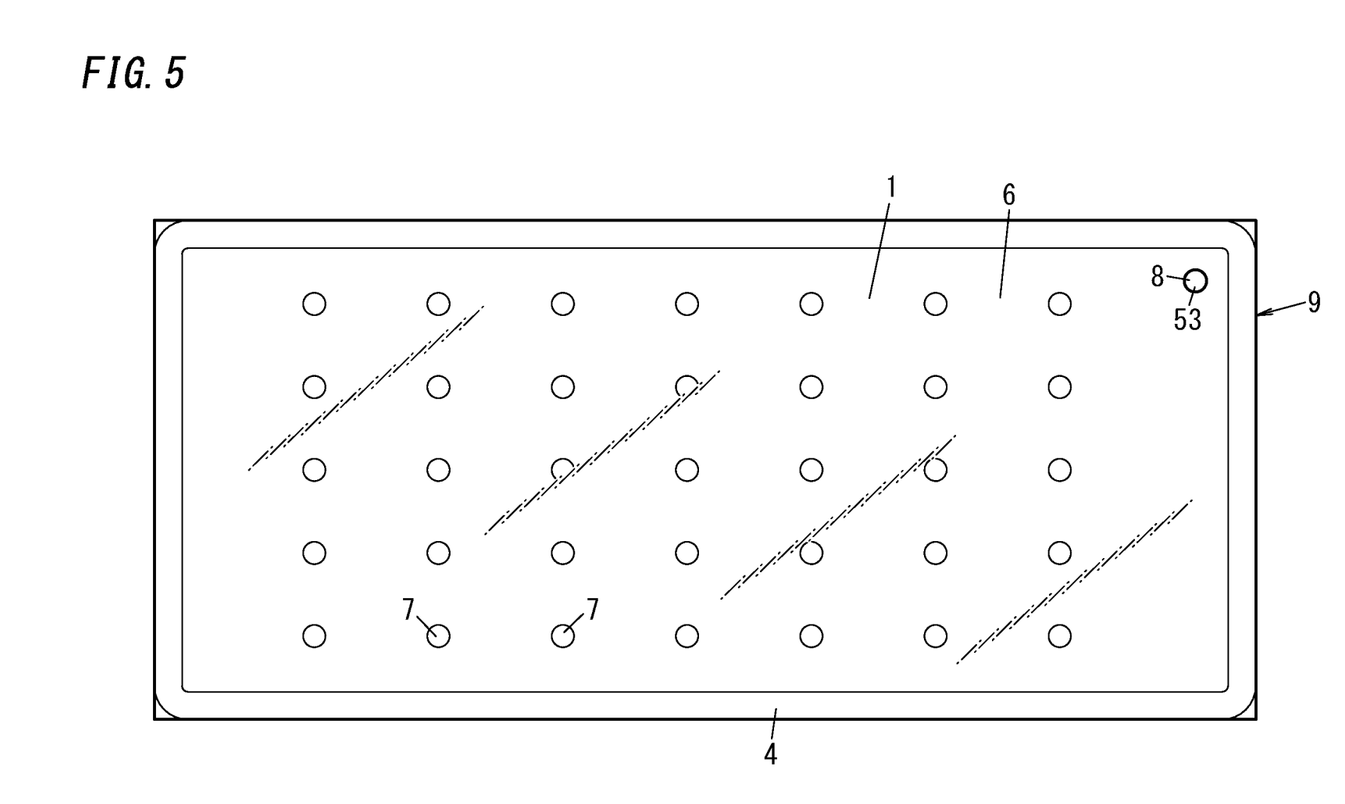
FIG. 5 is a plan view schematically illustrating a glass panel unit formed by the manufacturing method.

As illustrated in FIG. 5 and the like, the glass panel unit 9 of the first embodiment includes a first substrate 1, a second substrate 2, a seal 4, and a plurality of (a large number of) pillars 7.

Figure 3:
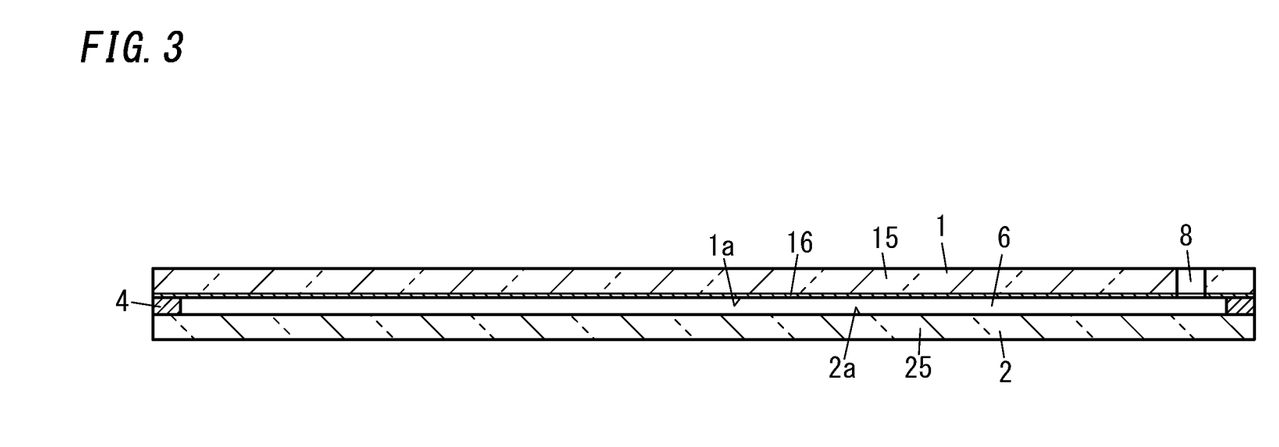
FIG. 3 is a sectional view taken along line A-A of FIG. 2.

The first substrate 1 includes a glass pane 15 having a flat-plate shape and a coating 16 covering a first side in a thickness direction of the glass pane 15 (see FIG. 3). The coating 16 is, for example, a solar reflective film but may be a film having other physical properties. In the first substrate 1, an appropriate coating may be applied not to the first side in the thickness direction of the glass pane 15 but to a second side (on an opposite side of the glass pane 15 from the first side), or an appropriate coating may be applied to both the first side and the second side in the thickness direction of the glass pane 15.

In the glass panel unit 9 of the first embodiment, one surface in a thickness direction of the first substrate 1 (hereinafter referred to as a "first surface 1a") corresponds to a surface of the coating 16. When the glass pane 15 is not provided with the coating 16, the first surface 1a of the first substrate 1 corresponds to one surface in the thickness direction of the glass pane 15. The first substrate 1 includes at least the glass pane 15. The first substrate 1 is transparent generally but may be semi-transparent or non-transparent.

The second substrate 2 includes a glass pane 25 having a flat-plate shape. One surface in a thickness direction of the second substrate 2 (hereinafter referred to as a "second surface 2a") corresponds to one surface in a thickness direction of the glass pane 25. The second substrate 2 includes at least the glass pane 25, and an appropriate coating may be applied to one or both sides in the thickness direction of the glass pane 25. The second substrate 2 is transparent generally but may be semi-transparent or non-transparent.

The seal 4 is applied on the second surface 2a of the second substrate 2 to have a frame shape and solidified after being melted, and thereby, the seal 4 exhibits a bonding function. The seal 4 lies sandwiched between the first substrate 1 and the second substrate 2 which are located to face each other. The seal 4 is hermetically bonded to an entire peripheral portion of the first surface 1a of the first substrate 1 and is hermetically bonded to an entire peripheral portion of the second surface 2a of the second substrate 2.

In the glass panel unit 9 of the first embodiment, an exhaust port 8 formed in the first substrate 1 is hermetically closed with sealant 53 which is in a cured state. Thus, an inside space 6 surrounded by the first substrate 1, the second substrate 2, and the seal 4 is hermetically sealed with the pressure in the inside space 6 being reduced. The first surface 1a of the first substrate 1 faces the inside space 6. The second surface 2a of the second substrate 2 faces the inside space 6.

The plurality of pillars 7 lie sandwiched between the first substrate 1 and the second substrate 2 which are located to face each other. The plurality of pillars 7 are located to be enclosed by the seal 4. That is, the plurality of pillars 7 are disposed in the inside space 6. Each pillar 7 is in contact with the first surface 1a of the first substrate 1 and the second surface 2a of the second substrate 2, and thereby, a gap between the first substrate 1 and the second substrate 2 is maintained as a prescribed space.

Note that in FIGS. 1 to 5, components are schematically illustrated. For example, the dimensional shape of each pillar 7, the gap between each two adjacent pillars 7, the thicknesses of the first substrate 1 and the second substrate 2, the volume of the inside space 6, and the like are different from actual ones. The number of the pillars 7 is not limited to that shown in the figure. There may be a case where no pillar 7 is disposed between the first substrate 1 and the second substrate 2.

Next, a manufacturing method of a glass panel unit of the first embodiment (hereinafter simply referred to as a "first manufacturing method") will be described.

Figure 6:
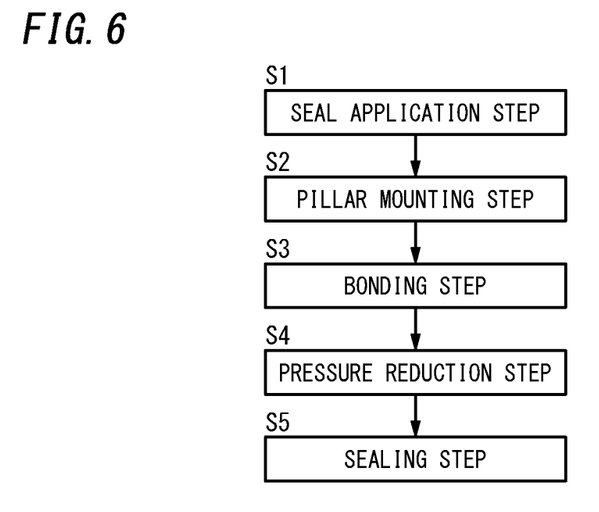
FIG. 6 is a flow diagram illustrating the manufacturing method.

The first manufacturing method includes a seal application step S1, a pillar mounting step S2, a bonding step S3, a pressure reduction step S4, and a sealing step S5 (see FIG. 6).

The seal application step S1 may first be performed, the pillar mounting step S2 may first be performed, or the seal application step S1 and the pillar mounting step S2 may concurrently be performed.

Figure 1:
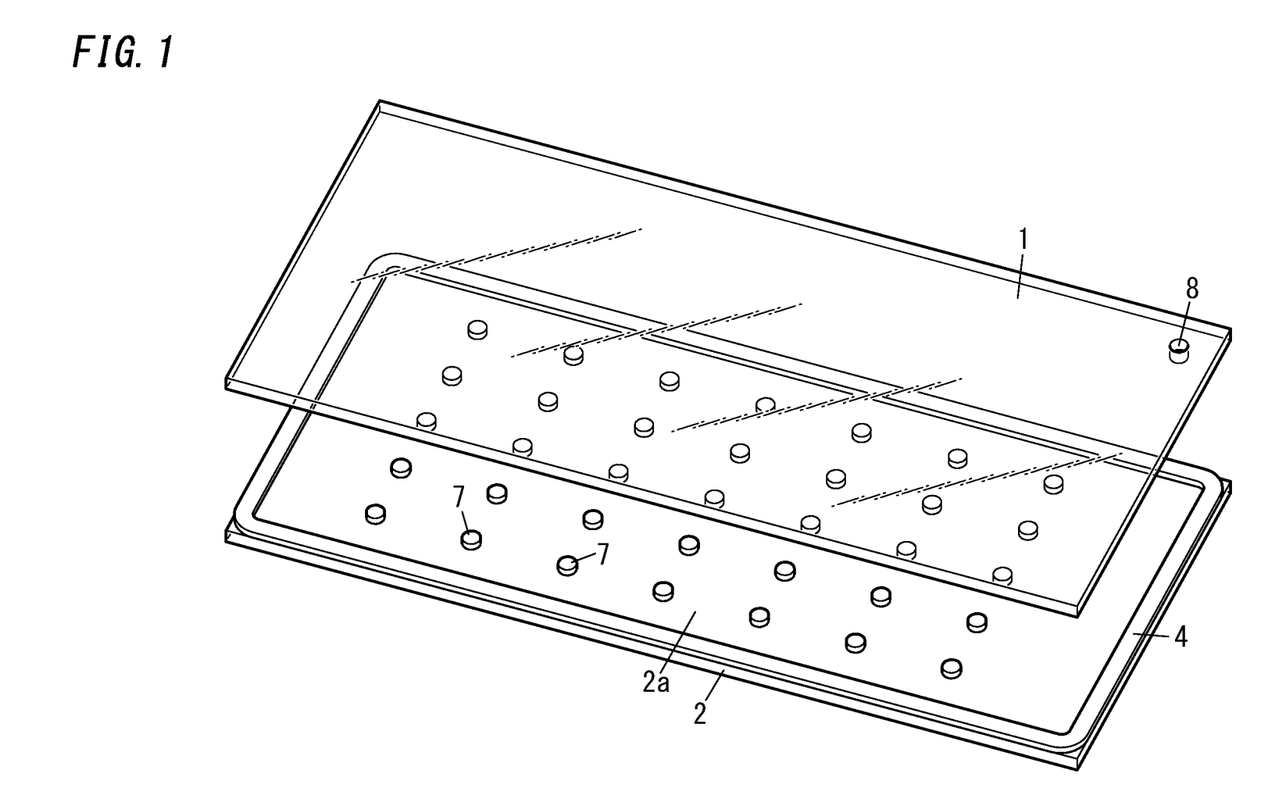
FIG. 1 is a perspective view schematically illustrating a step of a manufacturing method of a glass panel unit of a first embodiment.
Figure 2:
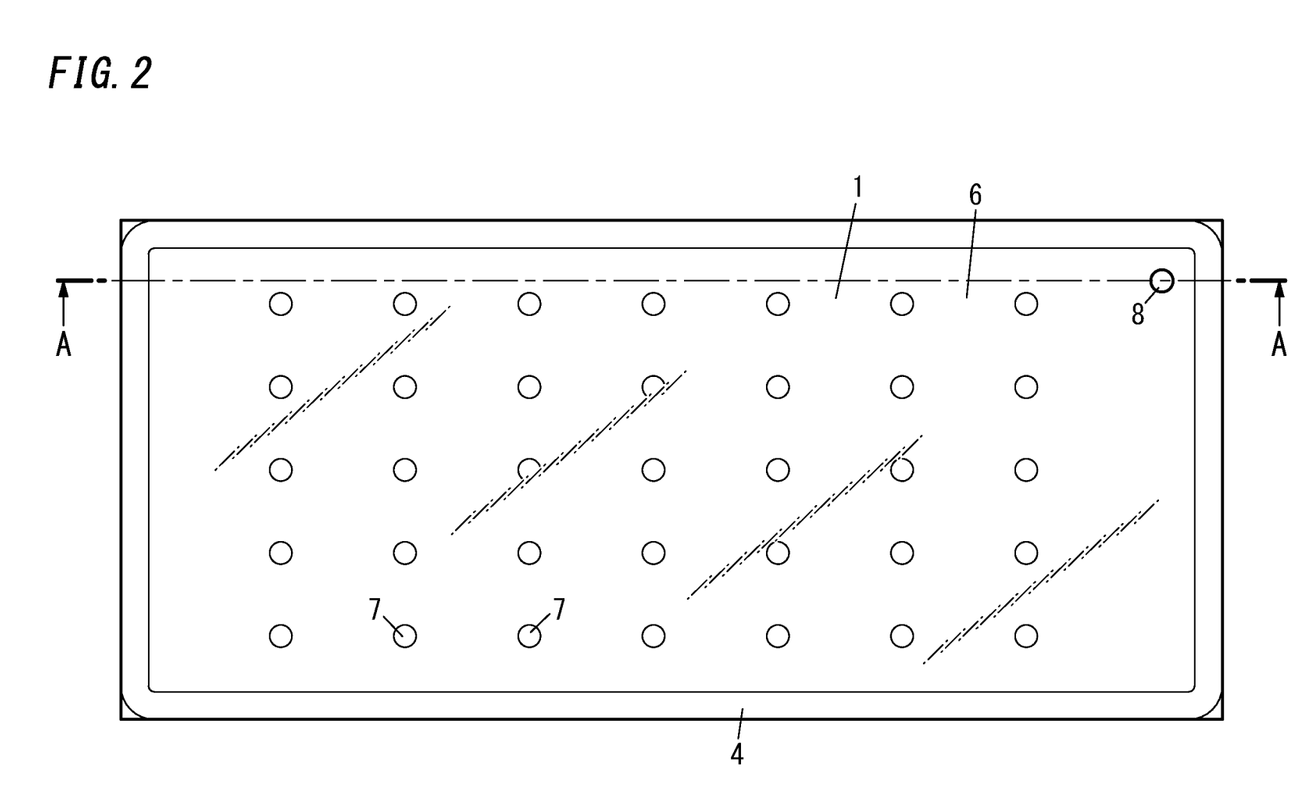
FIG. 2 is a plan view schematically illustrating a step in the manufacturing method.

In the seal application step S1, as illustrated in FIG. 1, the seal 4 containing glass frit is applied to a peripheral portion of the second surface 2a of the second substrate 2 to have a rectangular frame shape.

The exhaust port 8 is formed in the first substrate 1 to penetrate therethrough in the thickness direction. The exhaust port 8 is formed in a corner portion of the first substrate 1 having a rectangular shape in plan view.

In a pillar mounting step S2, the plurality of pillars 7 are mounted on the second surface 2a of the second substrate 2 according to a prescribed pattern. When the seal application step S1 and the pillar mounting step S2 are completed, the plurality of pillars 7 are located to be enclosed by the seal 4.

After the seal application step S1 and the pillar mounting step S2 are completed, the bonding step S3 is performed. In the bonding step S3, the first substrate 1 and the second substrate 2 with the seal 4 sandwiched therebetween are prepared as a set, the entirety of which is heated in a furnace.

In the bonding step S3, the seal 4 is once melted in the furnace and is then solidified along with a temperature drop, and thereby, the first substrate 1 and the second substrate 2 are hermetically bonded together with the seal 4. The inside space 6 hermetically surrounded by the seal 4 is thus formed between the first substrate 1 and the second substrate 2 bonded together. The inside space 6 may be in communication with an outside space through the exhaust port 8 (see FIG. 3).

Note that at this step, when the seal 4 and the plurality of pillars 7 are located, as described above, between the first substrate 1 and the second substrate 2, the seal 4 may be applied to any of the first surface 1a and the second surface 2a in the seal application step S1, and the plurality of pillars 7 may be mounted on any of the first surface 1a and the second surface 2a in the pillar mounting step S2. Also, the exhaust port 8 may be formed in any of the first substrate 1 and the second substrate 2.

After the bonding step S3, the pressure reduction step S4 is performed. In the pressure reduction step S4, air in the inside space 6 is exhausted to the outside through the exhaust port 8, and the pressure in the entirety of the inside space 6 is reduced to achieve a prescribed degree of vacuum (e.g., degree of vacuum lower than or equal to 0.1 Pa).

The exhausting process in the pressure reduction step S4 is performed with an exhaust device 5 (see FIG. 4) detachably connected to the first substrate 1 to be in communication with the exhaust port 8.

Figure 4:
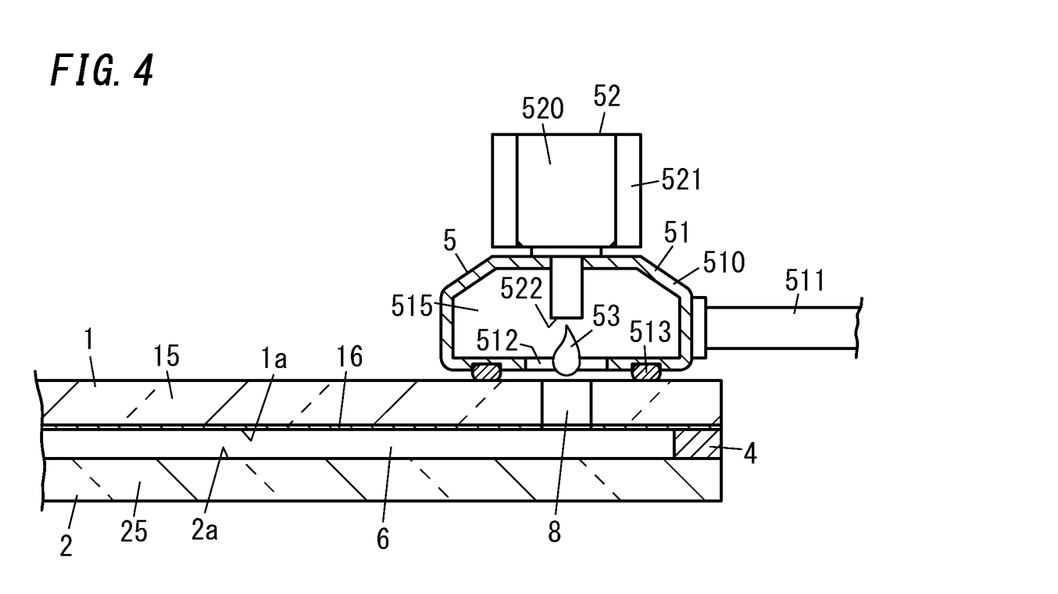
FIG. 4 is a partially cutaway side view schematically illustrating a main part in a step in the manufacturing method.

The exhaust device 5 includes an exhaust head 51 and an ejection unit 52 which are integrated with each other. The exhaust head 51 includes: a head body 510 having a hollow as an evacuation space 515 therein; a connector 511 which connects the evacuation space 515 of the head body 510 to a vacuum pump which is not shown in the figure; an opening 512 through which the evacuation space 515 of the head body 510 is open to the outside; and an O ring 513 disposed at a location surrounding the opening 512 when viewed from the outside. The connector 511 laterally extends from the head body 510 with the opening 512 in a position in which the head body 510 faces downward.

In the pressure reduction step S4, the exhaust head 51 is hermetically pressed onto an upper surface of one substrate (first substrate 1) of the first substrate 1 and the second substrate 2 with the opening 512 facing downward. The one substrate is located above the other of the first substrate 1 and the second substrate 2. At this time, the 0 ring 513 of the exhaust head 51 is hermetically pressed onto a portion of the upper surface of the first substrate 1, the portion entirely surrounding the exhaust port 8.

Note that when the exhaust port 8 is formed in a substrate (second substrate 2) of the first substrate 1 and the second substrate 2 which is located at a lower level, the exhaust head 51 is hermetically pressed onto the lower surface of the substrate (second substrate 2) at the lower level with the opening 512 facing upward.

In the pressure reduction step S4, in a state where the exhaust head 51 is pressed onto the first substrate 1 (or the second substrate 2), air in the evacuation space 515 of the exhaust head 51 is sucked through the connector 511. Thus, air in the inside space 6 between the first substrate 1 and the second substrate 2 is sucked (vacuumed) through the exhaust port 8.

Then, the sealing step S5 is performed. The sealing step S5 is performed by the ejection unit 52 in a state where the exhaust head 51 is pressed onto the first substrate 1 (or the second substrate 2) and the inside space 6 is vacuumed.

The ejection unit 52 includes a tank 520 in which the sealant 53 is reserved, a heater 521 configured to heat the tank 520, and an ejection port 522 which is open in the exhaust head 51.

The sealant 53 heating by the heater 521 and thus melted is ejected (dropped) from the ejection port 522 through the evacuation space 515 and the opening 512 to the outside of the exhaust head 51. Any material such as glass, a resin, or metal may be adopted as the sealant 53 as long as it melts with heat. When the head body 510 is in a position in which the opening 512 faces downward, the ejection unit 52 is located at an upper portion of the head body 510, and in the evacuation space 515 of the head body 510, the ejection port 522 is located above the opening 512.

Since the sealant 53 dropped into the exhaust port 8 in a reduced-pressure environment has viscosity, the sealant 53 forms an aggregate and stays at a location at which the exhaust port 8 is closed. Then, when the sealant 53 is cured due to a temperature drop, the sealant 53 thus cured hermetically closes the exhaust port 8. Thus, the glass panel unit 9 having thermal insulation properties as illustrated in FIG. 5 is obtained.

Note that in order to cause the sealant 43 to more likely stay at a location at which the exhaust port 8 is closed, a weir is preferably provided in the inside space 6 to suppress extension of the sealant 43, dropped into the exhaust port 8, into the inside space 6. The weir may be provided to have an annular shape with a notch for ventilation (e.g., C shape), for example, on the second surface 2a of the second substrate 2 (or the first surface 1a of the first substrate 1).

As described above, the steps included in the first manufacturing method are performed, and thereby, a glass panel unit 9 having a high thermal insulation property and an inside space 6 with a reduced pressure is efficiently obtained without performing a cuffing-off step as in the prior art technique.

(Second Embodiment)

Figure 7:
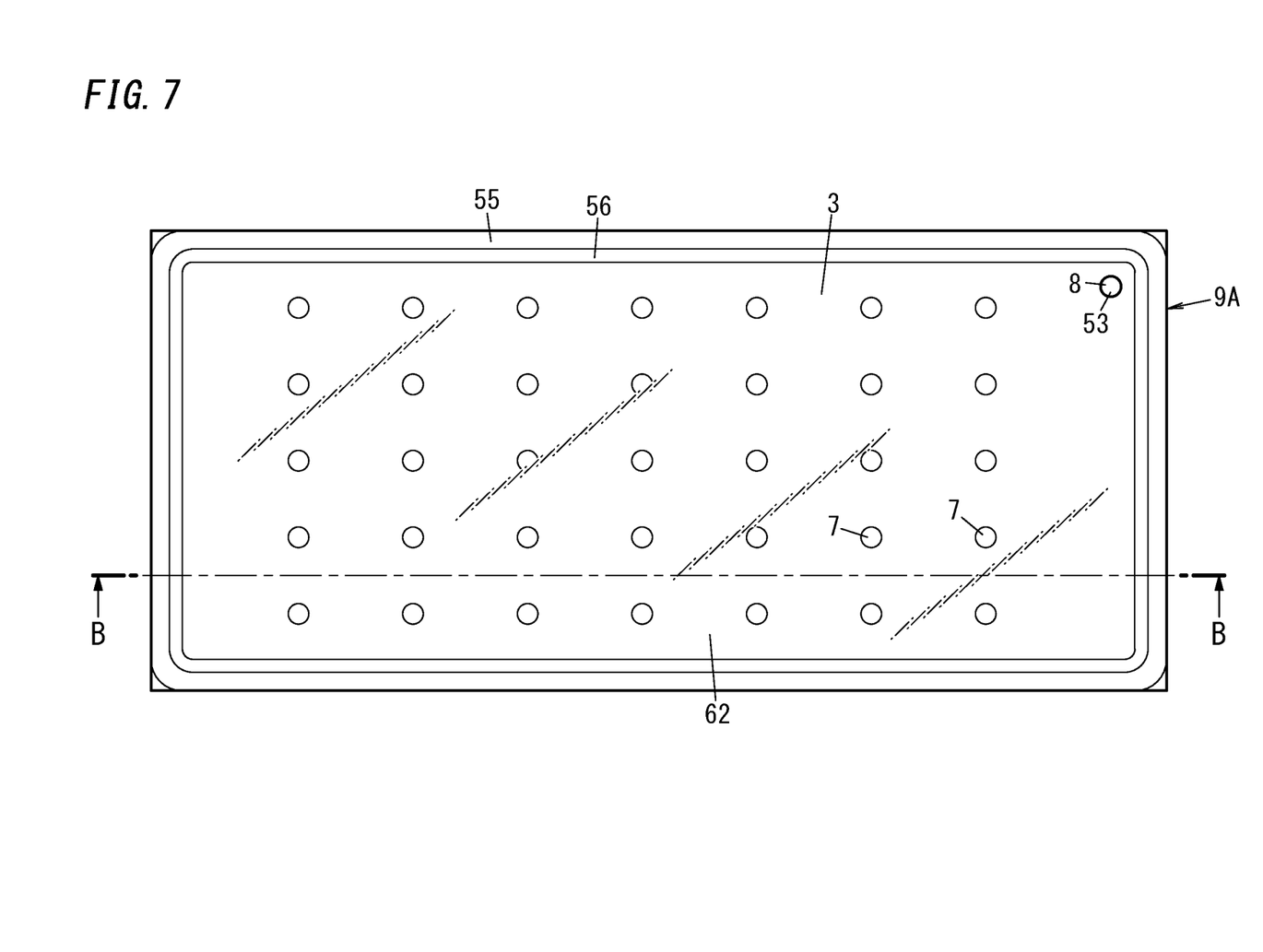
FIG. 7 is a plan view schematically illustrating a glass panel unit formed by a manufacturing method of a glass panel unit of a second embodiment.
Figure 8:
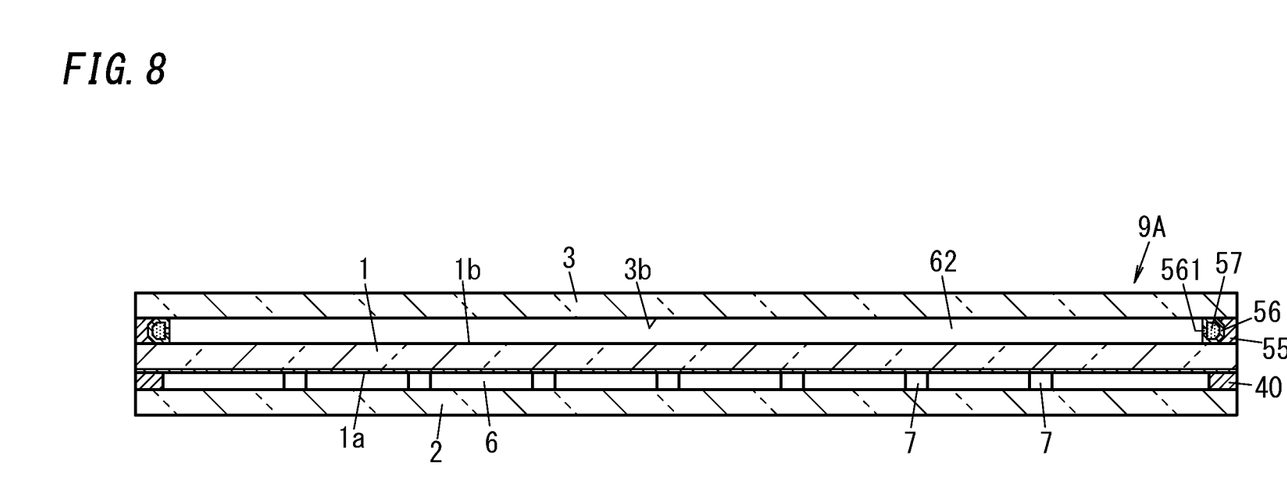
FIG. 8 is a sectional view taken along line B-B of FIG. 7.
Figure 9:
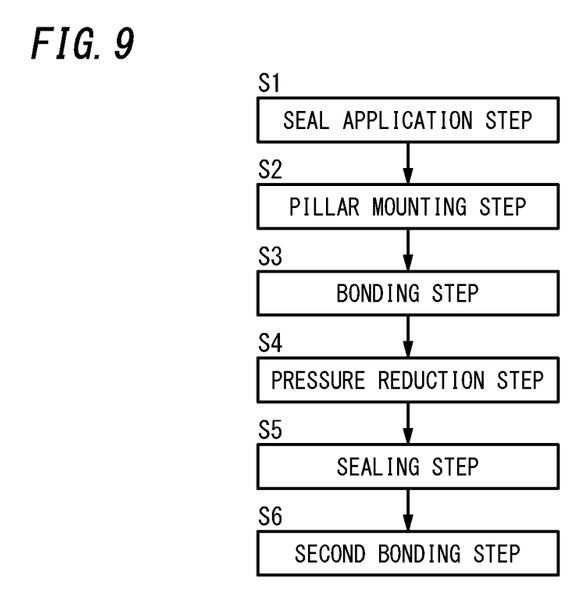
FIG. 9 is a flow diagram illustrating the manufacturing method of the second embodiment.

With reference to FIGS. 7 to 9, a glass panel unit 9A of a second embodiment and a manufacturing method thereof will be described. Note that components similar to those in the first embodiment are denoted by the same reference signs, and the detailed description thereof will be omitted.

The glass panel unit 9A of the second embodiment includes a third substrate 3 provided to face the first substrate 1 and a frame member 55 in addition to the components of the glass panel unit 9 of the first embodiment. The frame member 55 hermetically bonds entire peripheral portions of the first substrate 1 and the third substrate 3.

Similarly to the first substrate 1 and the second substrate 2, any appropriate panel may be adopted as the third substrate 3 as long as the third substrate 3 includes at least a glass pane. The third substrate 3 is transparent generally but may be semi-transparent or non-transparent.

A space 62 which is hermetically sealed is formed between counter surfaces 1b and 3b respectively of the first substrate 1 and the third substrate 3.

The third substrate 3 is disposed to face one substrate of the first substrate 1 and the second substrate 2. Although not shown in the figure, when the third substrate 3 is disposed to face the second substrate 2, the frame member 55 is bonded to peripheral portions of the second substrate 2 and the third substrate 3, and the space 62 which is sealed is formed between the second substrate 2 and the third substrate 3.

As illustrated in FIG. 8, a spacer 56 is further disposed on an inner side of the frame member 55. The spacer 56 has a frame shape having a hollow. The hollow of the spacer 56 is filled with desiccant 57.

The spacer 56 is made of metal such as aluminum and has a through hole 561 on an inner circumferential side thereof. The hollow of the spacer 56 is in communication with the space 62 via a through hole 561. The desiccant 57 is, for example, silica gel. The frame member 55 is preferably made of, for example, a highly airtight resin such as a silicon resin and butyl rubber.

The space 62 is a space sealed with the first substrate 1 (or the second substrate 2), the third substrate 3, and the frame member 55. The space 62 is filled with a dry gas. The dry gas is, for example, a dry rare gas such as argon gas or dry air. The dry air includes air dried after sealed in the space 62 due to the effect of the desiccant 57.

In the glass panel unit 9A of the second embodiment, an inside space 6 having a pressure reduced to a prescribed degree of vacuum and the space 62 filled with the dry gas are located between the third substrate 3 and the second substrate 2 (or the first substrate 1) which are located on both ends in a thickness direction of the glass panel unit 9A. Thus, the glass panel unit 9A of the second embodiment exhibits a further high thermal insulation property.

As illustrated in FIG. 9, a manufacturing method of a glass panel unit of the second embodiment includes a second bonding step S6 in addition to the steps in the first manufacturing method. The second bonding step S6 is a step of disposing the third substrate 3 to sandwich the frame member 55 and the spacer 56 between the third substrate 3 and one substrate of the first substrate 1 and the second substrate 2 to bond the one substrate and the third substrate 3 together with the frame member 55.

[Glass Window]

Figure 10:
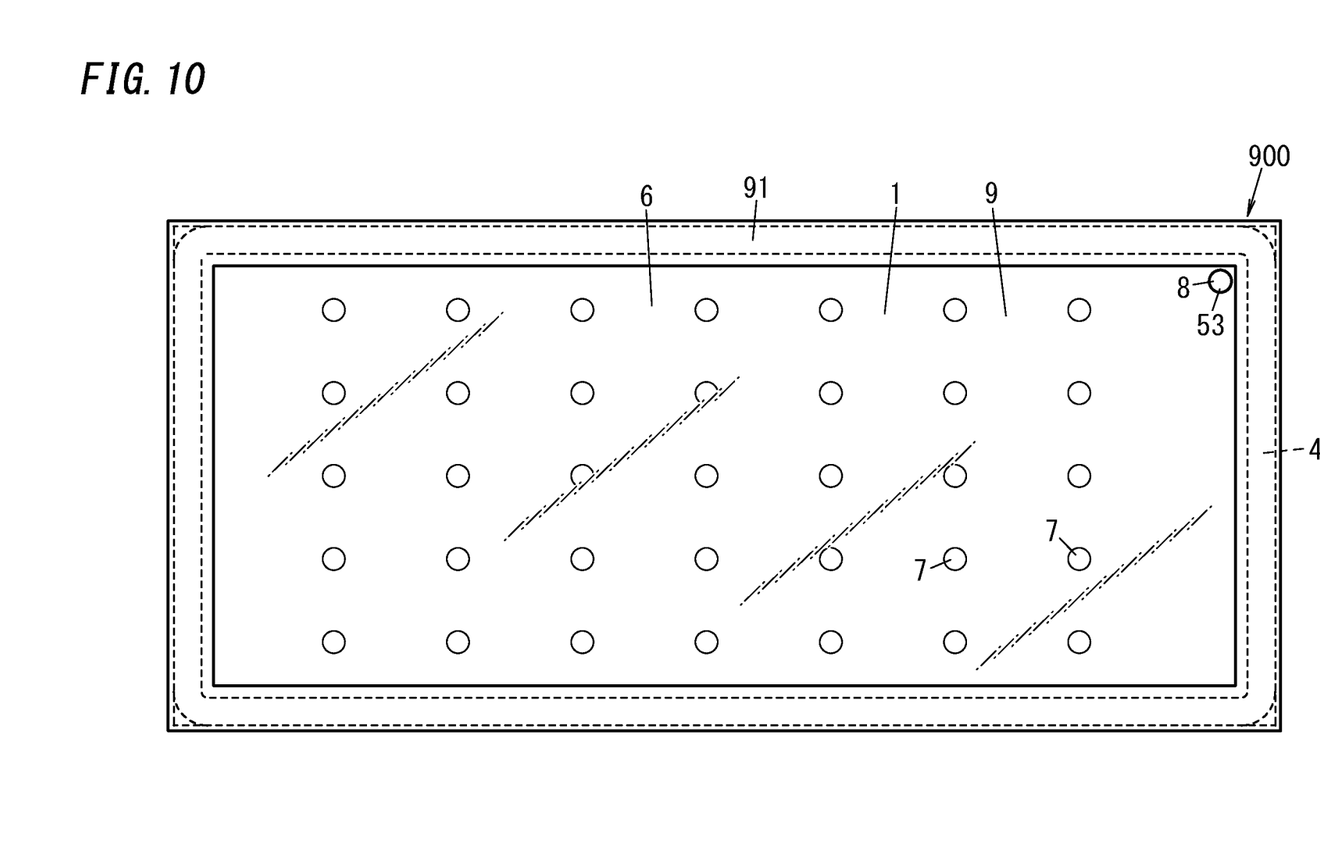
FIG. 10 is a plan view schematically illustrating a glass window including the glass panel unit of the first embodiment.

FIG. 10 shows a glass window 900 obtained by fitting a window frame 91 to the glass panel unit 9 of the first embodiment. The glass window 900 has a structure in which the window frame 91 having a rectangular frame shape is fit to a peripheral portion of the glass panel unit 9 having a rectangular shape in plan view. The glass window 900 has a high thermal insulation property. In the glass window 900, when viewed from the front side, the seal 4 of the glass panel unit 9 is preferably hidden by the window frame 91. Moreover, the exhaust port 8 of the glass panel unit 9 and the sealant 53 closing the exhaust port 8 are preferably hidden by the window frame 91.

Figure 11:
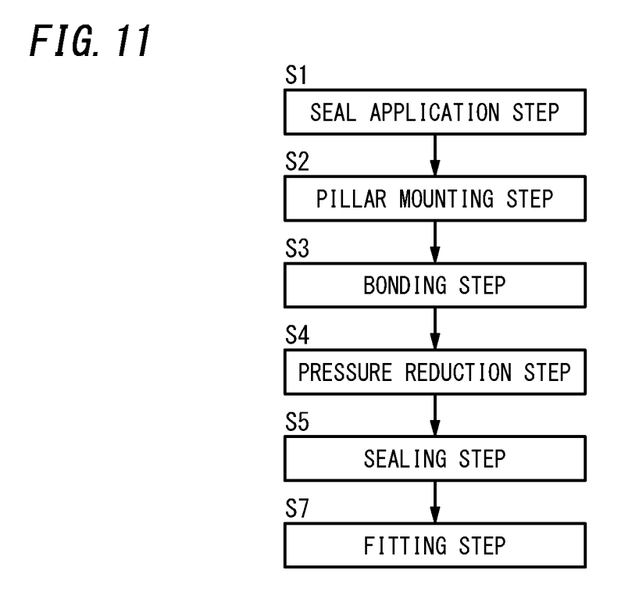
FIG. 11 is a flow diagram illustrating a manufacturing method of the glass window.

As illustrated in FIG. 11, a manufacturing method of the glass window 900 includes a fitting step S7 of fitting the window frame 91 to the glass panel unit 9 in addition to the steps of the first manufacturing method.

A target to which the window frame 91 is fitted is not limited to the glass panel unit 9 of the first embodiment. The window frame 91 may be fitted to the glass panel unit 9A of the second embodiment. Also in this case, a glass window 900 having a high thermal insulation property is obtained.

[Effects]

As can be seen from each of the above-described embodiments, a manufacturing method of a glass panel unit of a first aspect includes a bonding step S3, a pressure reduction step S4, and a sealing step S5.

The bonding step S3 is a step of hermetically bonding a first surface 1a on one side in a thickness direction of a first substrate 1 and a second surface 2a on one side in a thickness direction of a second substrate 2 together with a seal 4 having a frame shape. The first substrate 1 includes at least a glass pane 15. The second substrate 2 includes at least a glass pane 25.

The pressure reduction step S4 is a step of reducing a pressure in an inside space 6 surrounded by the first surface 1a, the second surface 2a, and the seal 4 through an exhaust port 8 formed in the first substrate 1 or the second substrate 2. The sealing step S5 is a step of sealing the exhaust port 8 with a reduced pressure in the inside space 6 being maintained.

In the sealing step S5, sealant 53 melted is ejected toward the exhaust port 8, thereby sealing the exhaust port 8 with the sealant 53.

The manufacturing method of the glass panel unit of the first aspect enables efficient manufacturing of a glass panel unit having thermal insulation properties without performing a cutting-off step as in the prior art technique. This provides the advantage that even when at least one of the first substrate 1 and the second substrate 2 is made of strengthened glass, a glass panel unit is efficiently manufactured and the advantage that the usage efficiency of materials is increased.

In a manufacturing method of a glass panel unit of a second aspect referring to the first aspect, in the pressure reduction step S4, the pressure in the inside space 6 is reduced by an exhaust device 5. The exhaust device 5 is detachably attached to the first substrate 1 or the second substrate 2 so as to be in communication with the inside space 6 through the exhaust port 8. In the sealing step S5, the sealant 53 melted is ejected from the exhaust device 5 into the exhaust port 8 with the pressure in the inside space 6 being reduced by the exhaust device 5.

In the manufacturing method of the glass panel unit of the second aspect, it is possible to efficiently perform the pressure reduction step S4 and the sealing step S5 by the exhaust device 5.

In a manufacturing method of a glass panel unit of a third aspect referring to the second aspect, the exhaust port 8 is formed in one substrate of the first substrate 1 and the second substrate 2. The one substrate is located above the other of the first substrate 1 and the second substrate 2. The exhaust device 5 is detachably attached to the one substrate. In the sealing step S5, the sealant 53 melted is dropped toward the exhaust port 8.

Thus, according to the manufacturing method of the glass panel unit of the third aspect, it is possible to efficiently supply the sealant 53 toward the exhaust port 8 which is a target location.

In a manufacturing method of a glass panel unit of a fourth aspect referring to the second or third aspect, the exhaust device 5 includes an exhaust head 51 having an evacuation space 515 and an ejection unit 52 having an ejection port 522. In the sealing step S5, in a state where the exhaust head 51 is pressed onto the first substrate 1 or the second substrate 2, the sealant 53 melted is ejected from the ejection port 522 and is supplied to the exhaust port 8 through the evacuation space 515.

Thus, according to the manufacturing method of the glass panel unit of the fourth aspect, the exhaust head 51 and the ejection unit 52 of the exhaust device 5 enable the pressure reduction step S4 and the sealing step S5 to be efficiency performed.

In a manufacturing method of a glass panel unit of a fifth aspect referring to the fourth aspect, the ejection unit 52 further includes a tank 520 in which the sealant 53 is reserved and a heater 521 configured to heat the sealant 53 such that the sealant 53 is melted.

Thus, according to the manufacturing method of the glass panel unit of the fifth aspect, the tank 520 and the heater 521 of the ejection unit 52 enable the sealing step S5 to be efficiently performed.

A manufacturing method of a glass panel unit of a sixth aspect referring to any one of the first to fifth aspect further includes a second bonding step S6. The second bonding step S6 is a step of bonding a third substrate 3 and one of the first substrate 1 and the second substrate 2 together with a frame member 55.

Thus, according to the manufacturing method of the glass panel unit of the sixth aspect, it is possible to manufacture a glass panel unit having a further high thermal insulation property.

A manufacturing method of a glass window of a first aspect includes a fitting step S7 of fitting a window frame 91 to the glass panel unit 9, 9A manufactured by the manufacturing method of the glass panel unit of any one of the first to sixth aspects.

Thus, the manufacturing method of the glass window of the first aspect enables efficient manufacturing of a glass window having a high thermal insulation property.

REFERENCE SIGNS LIST

1 FIRST SUBSTRATE
1a FIRST SURFACE
15 GLASS PANE
2 SECOND SUBSTRATE
2a SECOND SURFACE
25 GLASS PANE
3 THIRD SUBSTRATE
4 SEAL
5 EXHAUST DEVICE
51 EXHAUST HEAD
512 OPENING
515 EVACUATION SPACE
52 EJECTION UNIT
520 TANK
521 HEATER
522 EJECTION PORT
53 SEALANT
55 FRAME MEMBER
6 INSIDE SPACE
8 EXHAUST PORT
9 GLASS PANEL UNIT
9a GLASS PANEL UNIT
91 WINDOW FRAME
900 GLASS WINDOW
S3 BONDING STEP
S4 PRESSURE REDUCTION STEP
S5 SEALING STEP
S6 SECOND BONDING STEP
S7 FITTING STEP

The invention claimed is:

1. A manufacturing method of a glass panel unit, comprising:
a bonding step of hermetically bonding a first surface on one side in a thickness direction of a first substrate and a second surface on one side in a thickness direction of a second substrate together with a seal having a frame shaped, the first substrate including at least a glass pane, and the second substrate including at least a glass pane;

a pressure reduction step of reducing a pressure in an inside space surrounded by the first surface, the second surface, and the seal through an exhaust port formed in the first substrate or the second substrate; and a sealing step of sealing the exhaust port with a reduced pressure in the inside space being maintained, wherein in the sealing step, a drop of sealant in a melted state is ejected toward the exhaust port to seal the exhaust port with the sealant.

2. The manufacturing method of the glass panel unit of claim 1, wherein in the pressure reduction step, the pressure in the inside space is reduced by an exhaust device detachably attached to the first substrate or the second substrate so as to be in communication with the inside space through the exhaust port, and in the sealing step, the drop of sealant in the melted state is ejected from the exhaust device into the exhaust port with the pressure in the inside space being reduced by the exhaust device.

3. The manufacturing method of the glass panel unit of claim 2, wherein the exhaust port is formed in one substrate of the first substrate and the second substrate, the one substrate being located above the other of the first substrate and the second substrate, the exhaust device is detachably attached to the one substrate, and in the sealing step, the sealant reserved in the melted state is dropped toward the exhaust port.

4. The manufacturing method of the glass panel unit of claim 2, wherein the exhaust device includes an exhaust head having an evacuation space and an ejection unit having an ejection port, and in the sealing step, in a state where the exhaust head is pressed onto the first substrate or the second substrate, the drop of sealant in the melted state is ejected from the ejection port and is supplied to the exhaust port through the evacuation space.

5. The manufacturing method of the glass panel unit of claim 4, wherein the ejection unit further includes a tank in which the sealant is reserved and a heater configured to heat the sealant such that the sealant is melted.

6. The manufacturing method of the glass panel unit of claim 1, further comprising a second bonding step of bonding a third substrate to one of the first substrate and the second substrate with a frame member.

7. A manufacturing method of a glass window, comprising a fitting step of fitting a window frame to the glass panel unit manufactured by the manufacturing method of the glass panel unit of claim 1.

* * * * *